Apr. 10, 1923.
G. C. CASPER
VEHICLE SPRING
Filed Jan. 14, 1922
1,451,492
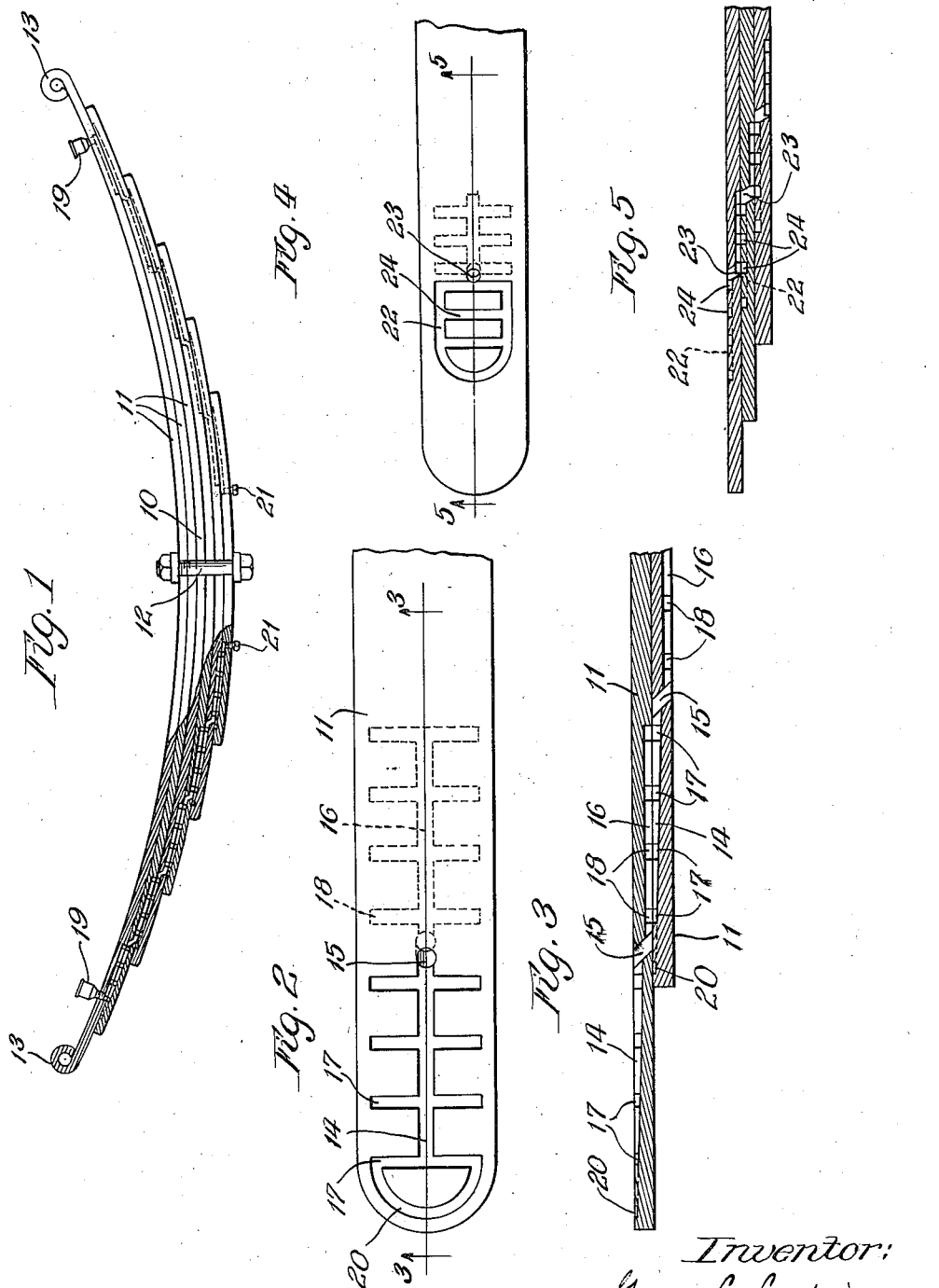
Inventor:
George C. Casper
By: Wm O. Belt Atty.

Patented Apr. 10, 1923.

1,451,492

UNITED STATES PATENT OFFICE.

GEORGE C. CASPER, OF CHICAGO, ILLINOIS, ASSIGNOR OF ONE-HALF TO ARTHUR N. EVANS, OF CHICAGO, ILLINOIS.

VEHICLE SPRING.

Application filed January 14, 1922. Serial No. 529,399.

*To all whom it may concern:*

Be it known that I, GEORGE C. CASPER, a citizen of the United States, residing at Chicago, in the county of Cook and State of Illinois, have invented certain new and useful Improvements in Vehicle Springs, of which the following is a specification.

This invention relates to springs composed of a plurality of superposed leaves of different length arranged in over-lapping relation and adapted to have relative sliding movement in bending; and the principal object of the invention is to supply lubricant to the surfaces where the sliding movement occurs.

Another object of the invention is to permit a suitable quantity of lubricant to be injected between the spring leaves by means of a force pump or the like, and afterward automatically distributed by the sliding movement in the use of the vehicle.

Another object of the invention is to provide a continuous passage from the top to the bottom leaf of the spring and suitable lateral or feed passages for distributing the lubricant from the continuous passage.

Another object of the invention is to form the grooves so that the lubricant will not be forced out at the terminal portions of the spring.

Further objects of the invention will become apparent as the description is read in connection with the accompanying drawing illustrating a preferred embodiment of the invention, and in which—

Fig. 1 is a side elevation partly in section of a semi-elliptical spring embodying the invention;

Fig. 2 is a plan view of a fragment of one of the intermediate leaves of the spring;

Fig. 3 is a sectional detail illustrating the communication between the grooves in the upper and lower faces of the spring leaves;

Fig. 4 is a plan view of a fragment of a spring leaf illustrating a modified form of groove; and Fig. 5 is a sectional view similar to Fig. 3 illustrating the arrangement of the grooves in successive spring leaves.

The semi-elliptic spring 10 selected for illustration is composed of six leaves 11 of different length arranged one upon the other with their ends in overlapping relation and rigidly secured together at about the middle by a bolt 12. The upper leaf of the spring is provided with bearings 13 to receive the shackle bolts by which the spring is connected to the body or frame. In this type of spring, the principal movement between the leaves takes place adjacent to the overlapping portions of the ends of the leaves and if lubricant is supplied to these portions practically all the requirements will be satisfied. The leaves of this sort of spring generally break if at all, near the middle, and therefore the cross-section of the leaves adjacent to the ends can be somewhat reduced without likelihood of failure in service. I have found it possible to form a series of grooves adjacent to the ends of the spring leaves that will form a continuous passage for the lubricant from the top to the bottom leaves without appreciably weakening the spring. As shown, each of the intermediate leaves 11 is provided on its upper surfaces with a longitudinal groove 14 communicating at or adjacent to its inner end through a passage 15 with a similar longitudinal groove 16 on the under face of each of the intermediate leaves of the spring. The under face of the top leaf and the upper face of the bottom leaf are provided with similar grooves 16 and 14 co-operating with the grooves in the other sections to form a continuous passage through the moving parts of the spring leaves. The upper surface of each of the intermediate leaves and the bottom leaf is also provided with a plurality of transverse grooves 17 intersecting the longitudinal groove 14 and extending to points adjacent to the edges of the spring leaves. The lower face of the intermediate leaves and the top leaf are provided with transverse grooves 18 intersecting the longitudinal grooves 16 and arranged similar to grooves 17. The top leaf is provided with a nipple or nipples 19 by which the lubricant is supplied to the grooves. I prefer to make this nipple suited to receive a high-pressure gun so that grease can be forced into the communicating grooves from the top to the bottom leaf. However, it is obvious that other forms of lubricant may be used with some degree of satisfaction. It will be observed by examination of Fig. 3 that the grooves 14 are made shallower as they approach the terminal portions of the leaves. The object of this is to make the grease tend to follow the communicating grooves and pass onto the space between the next pair of leaves, rather than working out towards the terminal of a leaf.

The upper surface of each intermediate leaf and the bottom leaf is provided close to the terminal with a curved groove 20 which will serve as a trap for lubricant which tends to work out at the end of the leaf. I have shown this groove as being shallow but it can also be made to have considerable depth. The trap groove forms a transverse abutment at the ends of all of the leaves with the exception of the top leaf to confine and prevent loss of the lubricant.

The grooves 17 and 18 on adjacent faces of the spring leaves should be substantially opposite when the vehicle is empty so that in greasing the springs the grooves will be in the best possible condition to receive a supply of grease, but during the bending movement these grooves pass partly or totally across the adjacent faces and by a sort of wiping action serve to distribute the lubricant to the bearing portions of the spring leaves. It is particularly important that the grooves 17 and 18 as well as the grooves 14 and 16 be formed in both the adjacent faces of the spring leaves. When grooves are formed in the upper faces only, a considerable supply of lubricant can be present without being of any use and when the grooves are made solely on the lower surfaces of the leaves the lubricant is fed too rapidly and is worked out between the leaves with the obvious undesirable results. By having the passages formed by mating grooves in the upper and lower faces, the most satisfactory results are obtained because a large supply of lubricant can be retained and properly distributed by the above described relative movement of the grooves 17 and 18. If desired the bottom leaf of the spring may be provided with openings 21 at the ends of the grooves 14 so that the old grease and other matter that may have found its way into the grooves may be forced out by the action of the gun applied to the nipples 19. In use, of course, these openings should be closed by suitable plugs to prevent the loss of lubricant.

The groove 20, as shown, is preferably made to connect with the end of the adjacent transverse groove 17 and in some cases I have found it desirable to extend this marginal groove along the sides of the leaf as indicated at 22 in Fig. 4. When this type of groove is used, the arrangement is substantially the same as shown in Figs. 1 and 3 so that the continuous supply passage is formed between the top and the bottom leaves of the spring which is intersected by the plurality of transverse groves serving to distribute the lubricant during the relative sliding movement that takes place in service. In this form it is desirable to have the connecting passages 23 made to communicate with one of the transverse grooves 24 or longitudinal grooves supplied to make proper connection.

I am aware that changes in the form and proportion and details of the construction may be made to adapt the invention for different embodiments and for different associations without departing from the spirit of the invention, and I reserve the right to make all changes which fairly fall within the scope of the following claims.

I claim:

1. In a vehicle spring a plurality of superposed leaves of different lengths, the adjacent faces of the leaves being provided with mating grooves and connecting openings, consisting of longitudinal grooves extending outwardly and inwardly from the openings at the upper and lower faces of the leaves respectively and provided at intervals with transverse branches, the longitudinal grooves and branches in the upper faces of the leaves mating with the grooves and branches in the lower faces of the contiguous leaves to form connecting channels when the leaves are in normal position and adapted to effect a wiping action of the lubricant when the leaves are deflected.

2. In a vehicle spring a plurality of superposed leaves of different lengths, the adjacent faces of the leaves being provided with mating grooves and connecting openings, consisting of longitudinal grooves extending outwardly and inwardly from the openings at the upper and lower faces of the leaves respectively and provided at intervals with transverse branches, the longitudinal grooves and branches in the upper faces of the leaves mating with the grooves and branches in the lower faces of the contiguous leaves to form connecting channels when the leaves are in normal position and adapted to effect a wiping action of the lubricant when the leaves are deflected, and the leaves being provided in their upper faces at their ends with transverse marginal trap grooves communicating with the said grooves and forming abutments across the ends of the leaves to confine and prevent loss of the lubricant.

3. In a vehicle spring a plurality of superposed leaves of different lengths, the adjacent faces of the leaves being provided with mating grooves and connecting openings, consisting of longitudinal grooves extending outwardly and inwardly from the openings at the upper and lower faces of the leaves respectively and provided at intervals with transverse branches, the longitudinal grooves and branches in the upper faces of the leaves mating with the grooves and branches in the lower faces of the contiguous leaves to form connecting channels when the leaves are in normal position and adapted to effect a wiping action of the lubricant when the leaves are deflected, the grooves and branches tapering in depth outwardly to present outwardly converging top and bottom walls to the lubricant to increase the resistance to the flow of the lubricant outwardly, and transverse marginal trap grooves being provided in the upper faces of the leaves at the ends thereof to form abutments across the ends of the leaves to confine the lubricant.

GEORGE C. CASPER.